United States Patent
Takaishi et al.

(10) Patent No.: US 11,652,745 B2
(45) Date of Patent: May 16, 2023

(54) ON-BOARD NETWORK SYSTEM AND PROGRAM

(71) Applicant: TOYOTA JIDOSHA KABUSHIKI KAISHA, Toyota (JP)

(72) Inventors: Daisuke Takaishi, Toyota (JP); Keisuke Tsuji, Nisshin (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 16 days.

(21) Appl. No.: 17/379,320

(22) Filed: Jul. 19, 2021

(65) Prior Publication Data
US 2022/0045952 A1 Feb. 10, 2022

(30) Foreign Application Priority Data
Aug. 7, 2020 (JP) .............................. JP2020-135400

(51) Int. Cl.
*H04L 47/12* (2022.01)
*H04L 47/11* (2022.01)
*H04L 47/24* (2022.01)

(52) U.S. Cl.
CPC .............. *H04L 47/12* (2013.01); *H04L 47/11* (2013.01); *H04L 47/2458* (2013.01)

(58) Field of Classification Search
CPC ......... H04L 47/12; H04L 47/10; H04L 47/11; H04L 47/2458; H04L 67/12; H04W 40/22; H04W 4/40; H04W 4/48; H04W 4/70
See application file for complete search history.

(56) References Cited

U.S. PATENT DOCUMENTS

| | | | | |
|---|---|---|---|---|
| 6,157,613 | A * | 12/2000 | Watanabe | H04L 12/5602 370/230.1 |
| 10,791,062 | B1 * | 9/2020 | Ramamurthy | H04L 47/30 |
| 2010/0165846 | A1 * | 7/2010 | Yamaguchi | H04W 8/04 370/236 |
| 2018/0126930 | A1 | 5/2018 | Ando et al. | |
| 2019/0347489 | A1 * | 11/2019 | Kitaura | G06F 16/908 |

FOREIGN PATENT DOCUMENTS

JP 2018-070121 A 5/2018

* cited by examiner

*Primary Examiner* — Mohamed A Kamara
(74) *Attorney, Agent, or Firm* — Oliff PLC

(57) ABSTRACT

An on-board network system includes at least one processor. Plural relay devices that temporarily retain received data and relay the retained data in descending order of relay priority levels include a first relay device. For each set of data retained at the first relay device, the processor measures a retention duration for which the data is retained without being relayed. Data whose measured retention duration exceeds a predetermined threshold is congested data. A second relay device is a different relay device from the first relay device among the plurality of relay devices, and is capable of relaying the congested data. The processor requests the second relay device to raise the relay priority level of the congested data.

10 Claims, 12 Drawing Sheets

FIG.4

| FRAME ID | RELAY SOURCE BUS | RELAY DESTINATION BUS | RETENTION DURATION THRESHOLD | MEASURED RETENTION DURATION | RELAY PRIORITY LEVEL |
|---|---|---|---|---|---|
| 0X200 | 2 | 1 | 50ms | 10ms | LOW |
| 0X220 | 1 | 2 | 10ms | 4ms | MEDIUM |
| 0X350 | 1 | 2 | 10ms | 4ms | HIGH |
| ... | ... | ... | ... | ... | ... |

FIG.7

| FRAME ID | RELAY SOURCE BUS | RELAY DESTINATION BUS | RETENTION DURATION THRESHOLD | MEASURED RETENTION DURATION | RELAY PRIORITY LEVEL |
|---|---|---|---|---|---|
| 0X300 | 4 | 3 | 5 ms | 4 ms | HIGH |
| 0X350 | 4 | 3 | 10 ms | 4 ms | HIGH |
| 0X220 | 2 | 3 | 10 ms | 15 ms | MEDIUM |

FIG.8

| FRAME ID | RELAY SOURCE BUS | RELAY DESTINATION BUS | RETENTION DURATION THRESHOLD | MEASURED RETENTION DURATION | RELAY PRIORITY LEVEL |
|---|---|---|---|---|---|
| 0X300 | 4 | 3 | 5 ms | 4 ms | HIGH |
| 0X350 | 4 | 3 | 10 ms | 4 ms | HIGH |
| 0X220 | 2 | 3 | 10 ms | 12 ms | HIGH |

FIG.10

| FRAME ID | RELAY SOURCE BUS | RELAY DESTINATION BUS | RETENTION DURATION THRESHOLD | MEASURED RETENTION DURATION | RELAY PRIORITY LEVEL |
|---|---|---|---|---|---|
| 0X200 | 2 | 1 | 50ms | 10ms | LOW |
| 0X210 | 1 | 2 | 10ms | 4ms | MEDIUM |
| 0X220 | 1 | 2 | 10ms | 4ms | MEDIUM |

FIG.11

| FRAME ID | RELAY SOURCE BUS | RELAY DESTINATION BUS | RETENTION DURATION THRESHOLD | MEASURED RETENTION DURATION | RELAY PRIORITY LEVEL |
|---|---|---|---|---|---|
| 0X200 | 2 | 1 | 50ms | 10ms | LOW |
| 0X210 | 1 | 2 | 10ms | 6ms | MEDIUM |
| 0X220 | 1 | 2 | 10ms | 2ms | HIGH |

ON-BOARD NETWORK SYSTEM AND PROGRAM

CROSS-REFERENCE TO RELATED APPLICATION

This application is based on and claims priority under 35 USC 119 from Japanese Patent Application No. 2020-135400 filed on Aug. 7, 2020, the disclosure of which is incorporated by reference herein.

BACKGROUND

Technical Field

The present disclosure relates to an on-board network system and a program.

Related Art

Japanese Patent Application Laid-Open (JP-A) No. 2018-070121 discloses an on-board network system provided with plural control sections, which are connected to one another by plural circuits and transmit and receive data, and relay devices (Gateway ECUs), which relay data transmitted and received between the control sections.

In this on-board network system, a priority level of transmission is specified in advance for each of date items. When data congestion occurs at a relay device, date items with at least a predetermined priority level are prioritized for relay. Thus, data with high priority levels is transferred with priority, and data transfer delays are suppressed.

However, according to the technology recited in JP-A No. 2018-070121, when data with a certain priority level is concentratedly received at a relay device, transfer delays for data with that priority level may not be adequately suppressed.

SUMMARY

The present disclosure is made in consideration of the matter described above; an object of the present disclosure is to provide an on-board network system and a program that may suppress data transfer delays of data relayed through plural relay devices.

An on-board network system according to a first aspect of the present disclosure includes: plural relay devices that temporarily retain received date items and relay the retained date items in descending order of relay priority levels; a measurement section that, for each date item retained at a first relay device included in the plural relay devices, measures a retention duration for which the date item is retained without being relayed; and a request section that, for a congested date item which is a date item having a measured retention duration that exceeds a predetermined threshold, request a second relay device to raise a relay priority level of the congested date item at the second relay device, the second relay device being a different relay device from the first relay device among the plural relay devices, and the second relay device being configured to relay the congested date item.

According to the on-board network system according to the first aspect of the present disclosure, each relay device temporarily retains received date items and transmits the retained date items in descending relay priority level order. Therefore, even if data is concentrated at a certain relay device and data congestion occurs, data with relatively high priority levels is prioritized and relayed. Therefore, transfer delays of data with high priority levels may be suppressed.

When data with a certain priority level is concentratedly received at a relay device, if date items are transferred only on the basis of priority level, it may not be possible to suppress transfer delays of a group of date items with the certain priority level. However, when transmission and reception of date items is relayed through plural relay devices, even if data congestion occurs at one of these relay devices, transfer durations of date items over whole communication paths thereof may be shortened if transfers of the date items are prioritized at others of the relay devices.

Accordingly, for each date item received at the first relay device, a retention duration for which the date item is retained without being relayed is measured. A congested date item is a date item whose measured retention duration is greater than the predetermined threshold. A request is sent to the second relay device, which is a relay device relaying the congested date item that is different from the first relay device, to raise the relay priority level of the congested date item. As a result, the date item that is congested at the first relay device is relayed with priority by the second relay device, and a transfer duration of the congested date item over the whole communication path thereof is shortened. Thus, even if data with a certain priority level is concentratedly received at the first relay device, transfer delays of that data may be suppressed.

In an on-board network system according to a second aspect of the present disclosure, in the configuration according to the first aspect, the threshold is specified individually for each date item.

According to the on-board network system according to the second aspect of the present disclosure, because the threshold of the retention duration is specified for each date item, the presence or absence of congestion may be determined accurately in accordance with types of data. As a result, data transfer delays may be suppressed effectively.

In an on-board network system according to a third aspect of the present disclosure, in the configuration according to the first aspect or the second aspect, the request section requests the second relay device to raise the relay priority level of the congested date item at the second relay device when the relay priority level of the congested date item at the first relay device is a maximum value.

According to the on-board network system according to the third aspect of the present disclosure, the request to raise the relay priority level of a congested date item is sent to the second relay device when a date item with a highest priority level is congested at the first relay device. Thus, when data with a high priority level is concentratedly received at the first relay device and congestion occurs, that data is relayed by the second relay device with priority and data transfer delays may be suppressed.

In an on-board network system according to a fourth aspect of the present disclosure, the configuration according to any one of the first to third aspects further includes a specification section that, when the relay priority level of the congested date item at the first relay device is less than a maximum value, raises the relay priority level of the congested date item at the first relay device.

According to the on-board network system according to the fourth aspect of the present disclosure, when the relay priority level of a date item that is congested at the first relay device is less than the maximum value, the relay priority level of the congested date item is raised and the congested date item may be relayed with priority by the first relay device. Therefore, transfer delays may be suppressed for date items with low relay priority levels, which tend to be vulnerable to data congestion. That is, relay of a date item at a data relay priority level less than the maximum value is postponed whenever a date item with a higher relay priority level than that date item is received at the first relay device. Consequently, the duration for which that date item is retained at the first relay device increases, and congestion of that date item is likely to occur. Accordingly, when congestion of a date item with a data relay priority level less than the maximum value occurs, a transfer delay may be suppressed by raising the relay priority level of that date item at the first relay device.

In an on-board network system according to a fifth aspect of the present disclosure, the configuration according to the fourth aspect further includes a relative determination section that determines whether the retention duration of a date item retained by the first relay device which is different from the congested date item, would exceed the threshold if the relay priority level of the congested date item at the first relay device were to be raised wherein, when a potential congested date item which is a date item having a retention duration that would exceed the threshold if the relay priority level of the congested date item were to be raised, is present, the relay priority level of the congested date item is preserved without being raised.

According to the on-board network system according to the fifth aspect of the present disclosure, if the congested date item at the first relay device has a relay priority level less than the maximum value but congestion of other data at the first relay device would occur if the relay priority level of the congested date item was raised, the priority level is not raised but preserved. Therefore, relay of data with a relatively low priority level is prioritized only when that will not cause congestion of other data at the first relay device. Thus, transfer delays of the first relay device as a whole may be suppressed effectively.

In an on-board network system according to a sixth aspect of the present disclosure, in the configuration according to the fifth aspect, the specification section: when the relay priority level of the potential congested date item at the first relay device is at least as high as the relay priority level of the congested date item at the first relay device, preserves the relay priority level of the congested date item without raising the relay priority level; and, when the relay priority level of the potential congested date item at the first relay device is lower than the relay priority level of the congested date item at the first relay device, raises the relay priority level of the congested date item.

According to the on-board network system according to the sixth aspect of the present disclosure, if the relay priority level of a potential congested date item is equal to or higher than that of the congested date item when the relay priority level of the congested date item is raised, the priority level of the congested date item is not raised but preserved. Therefore, a date item with an original relay priority level higher than that of the congested date item or an equal relay priority level is relayed with priority. On the other hand, if the relay priority level of the potential congested date item is lower than that of the congested date item, relay of the congested date item is prioritized and a transfer delay of the congested date item is suppressed. Thus, data transfer delays at the first relay device may be suppressed effectively.

In an on-board network system according to a seventh aspect of the present disclosure, in the configuration according to any one of the first to sixth aspects, each of the plurality of relay devices relays the received date items in FIFO order for each relay priority level.

According to the on-board network system according to the seventh aspect of the present disclosure, various received date items are transmitted in first in, first out (FIFO) order for each relay priority level. Therefore, at each relay device, a date item whose relay priority level is raised cuts in front of other date items that were previously equal in relay priority level and can be relayed with priority. Meanwhile, of date items with the same relay priority level as one another, the date item received first is relayed with priority in accordance with FIFO. Consequently, when a date item in a group of date items with a relatively high relay priority level, which date item was originally specified with a lower relay priority level, cuts in front, delays in transfers of the date items that originally had the high relay data priority level are suppressed because the date items are relayed in FIFO order. Therefore, transfer delays of date items with lower relay priority levels may be suppressed even while transfers of date items with high original relay priority levels are prioritized.

In an on-board network system according to an eighth aspect of the present disclosure, in the configuration according to any one of the first to seventh aspects, when a plural number of the second relay device are present, the request section requests every the second relay device to raise the relay priority level of the congested date item at the second relay device.

According to the on-board network system according to the eighth aspect of the present disclosure, when there is a plural number of the second relay device, the first relay device sends the request to raise the relay priority level of the congested date item from the first relay device to all the second relay devices. Therefore, in contrast to a configuration in which a request is sent only to a particular second relay device, there is no need to generate data including a particular address when making the request. Thus, a processing load at the first relay device may be reduced and a delay caused by overloading of the first relay device may be suppressed.

In an on-board network system according to a ninth aspect of the present disclosure, in the configuration according to any one of the first to seventh aspects, the request section requests the second relay device to raise the relay priority level of the congested date item at the second relay device, the second relay device being a different relay device from the first relay device among the plurality of relay devices and being connected to at least one of an upstream side or a downstream side of the first relay device in a transmission direction of the congested date item.

According to the on-board network system according to the ninth aspect of the present disclosure, a request to raise the relay priority level of a congested date item that is congested at the first relay device is sent to the second relay device that is connected to one side or the other side of the first relay device in the transmission direction of the congested date item. That is, the first relay device sends a request to raise the relay priority level of the congested date item to a second relay device that is adjacent to the first relay device in the communication path. Therefore, transmission of data relating to the request to different second relay devices that are unrelated to the communication path of the congested date item may be eliminated. Thus, loads on circuits linking the relay devices may be reduced and delays caused by overloading of the circuits may be suppressed.

According to the present disclosure, transfer delays of data in the on-board network system may be suppressed.

BRIEF DESCRIPTION OF THE DRAWINGS

Exemplary embodiments of the present invention will be described in detail based on the following figures, wherein:

FIG. 4 is an example of a relay table of the gateway ECU according to the exemplary embodiment;

FIG. 7 is an example of a relay table prior to execution of the relay priority processing at a second gateway according to the exemplary embodiment;

FIG. 8 is an example of a relay table subsequent to execution of the relay priority processing at the second gateway according to the exemplary embodiment;

FIG. 10 is an example of a relay table prior to execution of the relay priority level change processing at a first gateway according to the exemplary embodiment;

FIG. 11 is an example of a relay table subsequent to the execution of the relay priority level change processing at the first gateway according to the exemplary embodiment.

DETAILED DESCRIPTION

Figure 1:
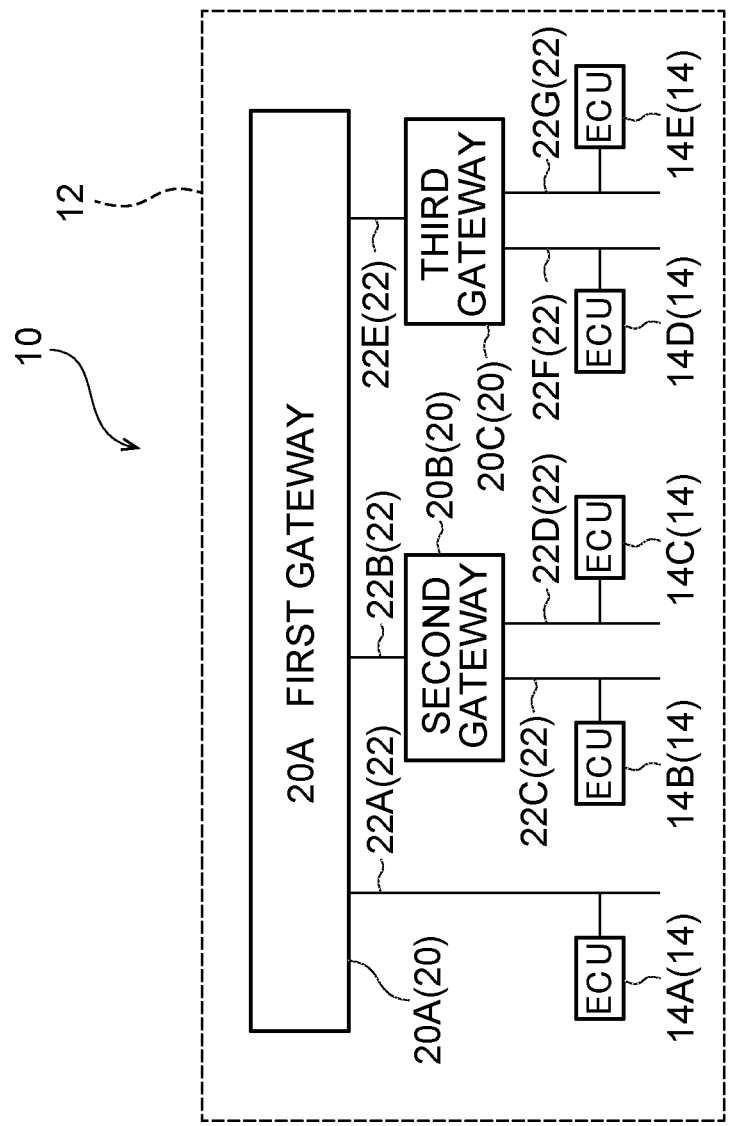
FIG. 1 is a block diagram showing a schematic configuration of an on-board network system according to an exemplary embodiment of the disclosed technology.

Herebelow, examples of embodiments of the present disclosure are described with reference to the drawings. In the drawings, structural elements and portions that are the same or equivalent are assigned the same reference symbols. Dimensional proportions in the drawings may be exaggerated for convenience of description and may be different from actual proportions.

Outline

FIG. 1 is a diagram showing a schematic configuration of an on-board network system 10 according to an exemplary embodiment. As shown in FIG. 1, the on-board network system 10 is configured to enable data communications between plural electronic control units (ECUs) 14 installed in a vehicle 12.

The on-board network system 10 includes a plural number of gateway ECUs 20 that serve as relay devices. The gateway ECUs 20 of the present exemplary embodiment include a first gateway ECU 20A, a second gateway ECU 20B and a third gateway ECU 20C. These gateway ECUs 20 each include relay functions, which are described below. The gateway ECUs 20 constitute a "first relay device" and "second relay devices" of the present invention.

Below, the first gateway ECU 20A, second gateway ECU 20B and third gateway ECU 20C are referred to as, respectively, the first gateway 20A, second gateway 20B and third gateway 20C. Where there is no need to distinguish each gateway ECU 20, it is simply referred to as the gateway 20.

Figure 5:
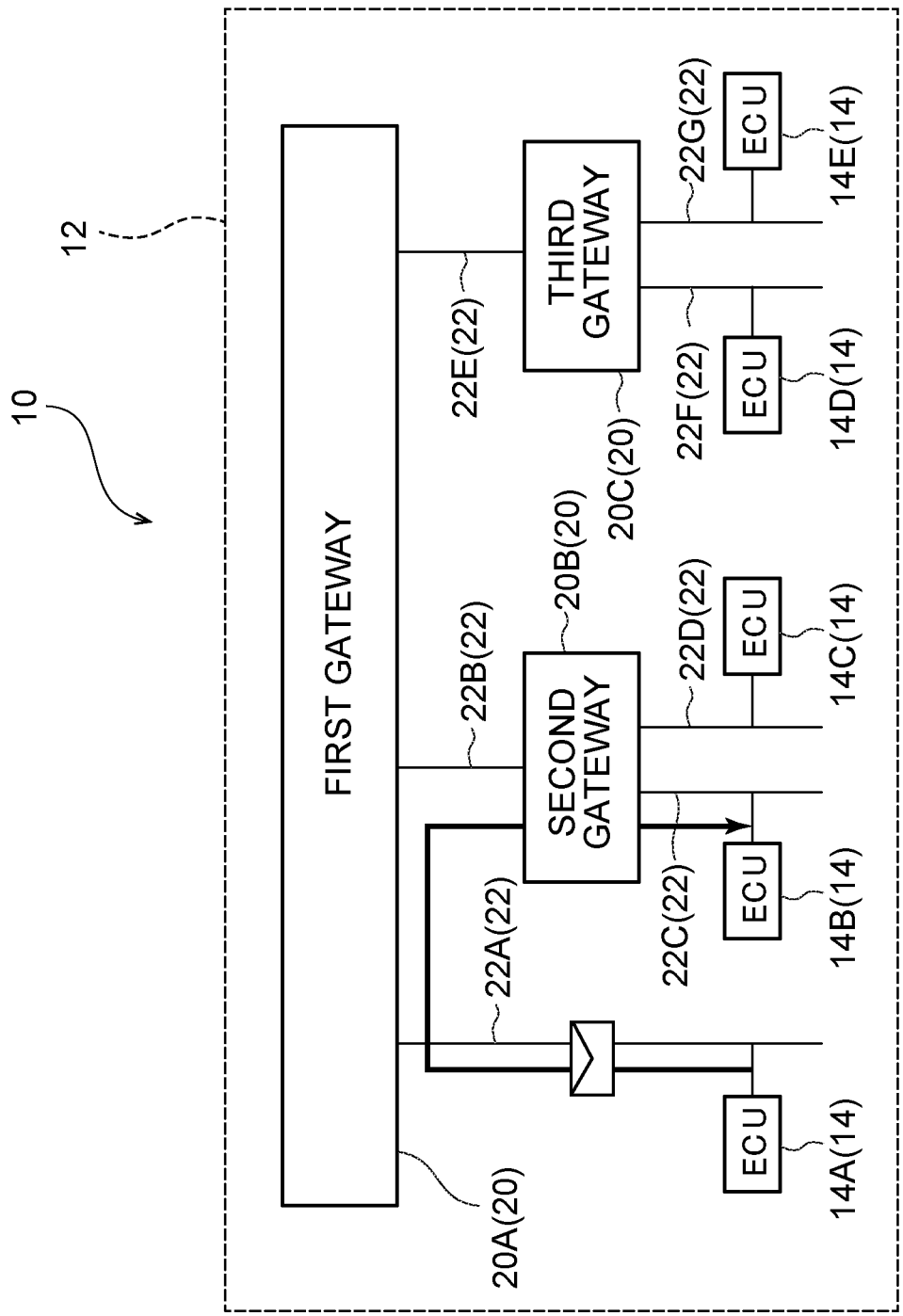
FIG. 5 is an example of a communication path of data through the on-board network system according to the exemplary embodiment.

The respective ECUs 14 (A to E) and gateways 20 are connected via respective external buses 22 (A to G). Data created or acquired at each ECU 14 is relayed through the gateways 20 and transferred to a transmission destination ECU 14. For example, as shown in FIG. 5, data transmitted from the ECU 14A to the ECU 14B is relayed by the first gateway 20A and the second gateway 20B and received by the ECU 14B, via the external bus 22A, the external bus 22B and the external bus 22C. Accordingly, each gateway 20 includes plural ports and the ECUs 14 are connected to the plural ports via the external buses 22. Each gateway 20 is a relay device that relays data inputted at each port to any of the other ports.

Communications in the external buses 22 according to the present exemplary embodiment are conducted in accordance with the Controller Area Network (CAN) protocol. Data transmitted and received between the ECUs 14 is transmitted and received as communication frames in accordance with the CAN protocol. Each communication frame includes a frame ID for communication arbitration in the CAN protocol, depending on the type of data and suchlike. A communications system of the external buses 22 is not limited to CAN; CAN with Flexible Data-Rate (CAN FD), Ethernet (registered trademark) or the like may be employed.

The ECUs 14 and gateways 20 are described in more detail below.

Each ECU 14 includes a central processing unit (CPU), read-only memory (ROM), random access memory (RAM), storage, a communications interface (I/F), and an input/output interface. The CPU, ROM, RAM, storage, communications interface and input/output interface are connected with one another to be capable of communications via an internal bus.

The ECUs 14 are connected, via the input/output interfaces, with accessories, which are not shown in the drawings, that are required for control of the vehicle 12 or structure the vehicle 12. Accessories include, for example, various sensors installed in the vehicle such as a vehicle speed sensor, a shift position sensor, a steering angle sensor of a steering wheel and the like, and various switches such as an ignition switch and the like. The ECUs 14 to which the accessories are connected are various ECUs such as an engine ECU, a braking ECU, a steering ECU, a transmission ECU, a body ECU, a meter ECU, an air conditioning ECU, a pre-crash safety (PCS) ECU, a lane keeping assist (LKA) ECU, a multimedia ECU, a smart key ECU and so forth.

If the vehicle 12 is a hybrid vehicle (HV), an electric vehicle (EV) or a fuel cell vehicle (FCV), then an HV ECU that controls respective outputs of an engine and a driving motor or an EV ECU that controls output of a driving motor may be employed instead of the engine ECU.

Gateway ECU

Figure 2:
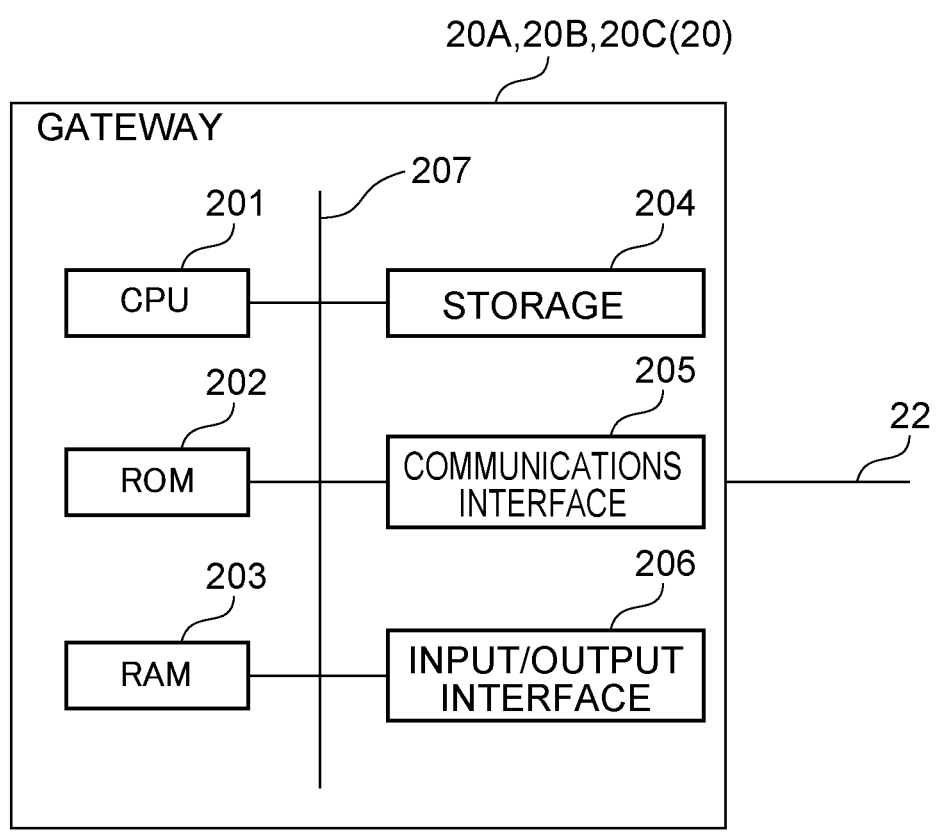
FIG. 2 is a block diagram showing hardware structures of a gateway ECU according to the exemplary embodiment.

FIG. 2 is a block diagram showing hardware structures of each gateway 20, which serves as a relay device.

As shown in FIG. 2, the gateway 20 includes a central processing unit (CPU) 201, read-only memory (ROM) 202, random access memory (RAM) 203, storage 204, a communications interface (I/F) 205, and an input/output interface 206. The CPU 201 is an example of a processor, and the RAM 203 is an example of memory. The CPU 201, ROM 202, RAM 203, storage 204, communications interface 205 and input/output interface 206 are connected with one another to be capable of communications via an internal bus 207.

The CPU 201 is a central arithmetic processing unit that executes various programs and controls respective parts. That is, the CPU 201 reads a program from the ROM 202 and executes the program using the RAM 203 as a workspace. The CPU 201 implements control of the structures described above and various kinds of computational processing in accordance with programs recorded in the ROM 202 or storage 204. In the present exemplary embodiment, a communications program for relaying data received by the gateway 20 is stored at the ROM 202.

The ROM 202 stores various programs and various kinds of data. The RAM 203 serves as a workspace, temporarily memorizing programs and data.

The storage 204 is structured by storage equipment such as a hard disk drive (HDD), a solid state drive (SSD), a flash memory or the like. The storage 204 stores various programs, including an operating system, and various kinds of data.

The communications interface 205 is an interface for communicating with the other ECUs 14, using communication standards according to the CAN protocol. The communications interface 205 is connected to the external buses 22.

The input/output interface 206 is an interface for communicating with the accessories installed in the vehicle 12. No accessories are connected to the input/output interface 206 shown in FIG. 2, but various sensors connected to the ECUs 14 may be connected to the input/output interfaces of the gateways 20.

When the above-mentioned communications program is executed, the gateway 20 uses the hardware resources mentioned above to realize various functions. Functional structures realized by the 20 are now described.

Figure 3:
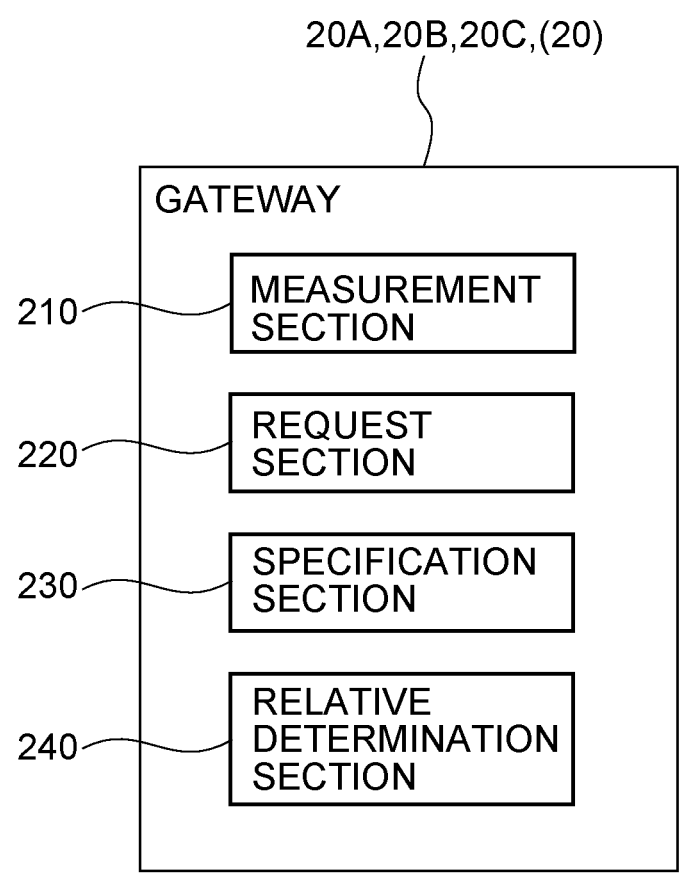
FIG. 3 is a block diagram showing functional structures of the gateway ECU according to the exemplary embodiment.

FIG. 3 is a block diagram showing an example of functional structures of the gateway 20.

As shown in FIG. 3, as functional structures, the gateway 20 includes a measurement section 210, a request section 220, a specification section 230 and a relative determination section 240. The gateway 20 memorizes the communications program in the ROM 202 and memorizes a relay table as illustrated in FIG. 4 in the storage 204. The functional structures are realized by the CPU 201 reading and executing the program memorized in the ROM 202.

The relay table is an example of a storage format for memorizing information relating to CAN communication frames received by the communications interface 205 in a buffer. The buffer is provided at, for example, the storage 204. The buffer is a memory or data retention unit that receives data relayed between the ECUs 14 (A to E) from the external buses 22 and temporarily retains the data until the data is to be outputted to a circuit connecting to the ECU 14 that is the transmission destination (any one or a plural number of the ECUs 14 other than the ECU 14 that is the transmission source).

FIG. 4 is an example of a relay table memorized at the buffer. The relay table stores various communication frames in the order they are received. For each communication frame, the relay table memorizes information such as the frame ID, a relay source bus, a relay destination bus, a retention duration threshold, a measured value of retention duration, a relay priority level and the like. The relay source bus and relay destination bus are memorized using numbers from 1 to 7 corresponding to, respectively, the external buses 22A to 22G. A retention duration is a duration for which a received communication frame is retained at the gateway 20 without being relayed, which is the duration for which the communication frame is retained at the buffer.

The retention duration threshold is a value that is specified in advance for each frame ID and is, for example, a duration that is specified such that various kinds of control of the vehicle will not be affected. The measured value of retention duration is a retention duration measured by the measurement section 210, which is described below. The relay priority level is a value set in accordance with the frame ID of the received communication frame and represents a rank in a priority sequence for outputting the communication frames. In the present exemplary embodiment, as an example, the relay priority level is data representing "Low" for communication frames with frame IDs from 0x100 to 0x200, data representing "Medium" for communication frames with frame IDs from 0x201 to 0x299, and data representing "High" for communication frames with frame IDs at or above 0x300. The relay priority level is not limited to the three levels High, Medium and Low but may be specified as appropriate in accordance with requirements.

When the communications program is executed, the communication frames stored in the buffer are outputted in accordance with priority relay rules. The priority relay rules are rules for determining the order in which the communications frames are to be outputted from the buffer, that is, transmitted from the gateway 20 to the transmission destination ECUs 14. In the present exemplary embodiment, the communication frames stored in the buffer are relayed in descending order of the relay priority levels, from High to Medium to Low. When there are plural communication frames with the same relay priority level, the communication frames are transmitted in the order the communication frames were received at the gateway 20, that is, in first in, first out (FIFO) order.

The measurement section 210 includes a counter function for measuring the retention durations for which the received communication frames are retained at the buffer.

The request section 220 includes a function for, when there is congested data at the gateway 20, making a request to different gateways 20 structuring the on-board network system 10 to raise the relay priority level of a communication frame corresponding to the congested data.

According to the execution of relay priority processing and relay priority level change processing, which are described below, a determination as to whether there is congested data at the gateway 20 is made by a determination as to whether a retention duration measured by the measurement section 210 exceeds the corresponding retention duration threshold. That is, when a retention duration measured by the measurement section 210 exceeds the threshold for a certain frame ID in the relay table, it is determined that the data corresponding to that frame ID is congested data at the gateway 20. On the other hand, when a retention duration measured by the measurement section 210 is equal to or less than the threshold for a certain frame ID, the gateway 20 determines that there is no congested data with that frame ID.

When there is congested data at the gateway 20 according to the determination described above, the request section 220 sends a request to raise the relay priority level of the frame ID corresponding to the congested data to all gateways 20 that are connected to be capable of communication with the present gateway 20 via the external buses 22. For example, when a date item with a predetermined frame ID is a congested date item at the first gateway 20A, the gateway 20A sends a request to raise the relay priority level of that frame ID to the second gateway 20B and the third gateway 20C. Thus, a request that does not designate a particular transmission destination may be implemented as a communication frame that does not contain a transmission destination address, which is beneficial in reducing processing loads of the gateways 20. On the other hand, when a data communication amount would be increased because a request may be sent to the gateways 20 that are not relaying the congested date item, that is, to the gateways 20 that are not disposed on a communication path of the congested date item, loads on circuits might be increased by occurrences of data collisions and the like. Therefore, with a view to reducing loads on circuits, a request may be sent to different gateways 20 that are connected with the present gateway 20 at one or both of an upstream side and downstream side in a transmission direction of the congested date item, to raise the relay priority level of the congested data at these different gateways 20.

The specification section 230 includes a function that, in accordance with the execution of the relay priority processing and the relay priority level change processing, raises the relay priority level of the frame ID of a congested date item if the relay priority level of that frame ID is less than a maximum value.

The relative determination section 240 includes a function that, in accordance with the execution of the relay priority processing and the relay priority level change processing, relatively determines whether or not there will be a congested date item with another frame ID in the buffer if the relay priority level of a particular frame ID is raised.

This determination is based on measured values empirically obtained by the measurement section 210. That is, the relative determination section 240 temporarily raises the relay priority level of a certain frame and makes a determination as to whether, at that time, there is congested data in the data of different frame IDs stored in the buffer.

The determination is not limited to a determination based on measurement values but may be an analytical determination using publicly known queueing theory based on a processing speed of the gateway 20 and a frequency of data inputs. That is, queueing theory is applied to the condition in which the relay priority level of the particular frame ID is raised. Retention durations of communication frames in the buffer are predicted, and a predictive determination as to whether there will be congested data is made on the basis of whether a predicted value exceeds the corresponding retention duration threshold.

Operation and Effects

Now, operation of the gateways 20 and flows of processing executed by the gateways 20 are described together.

Figure 6:
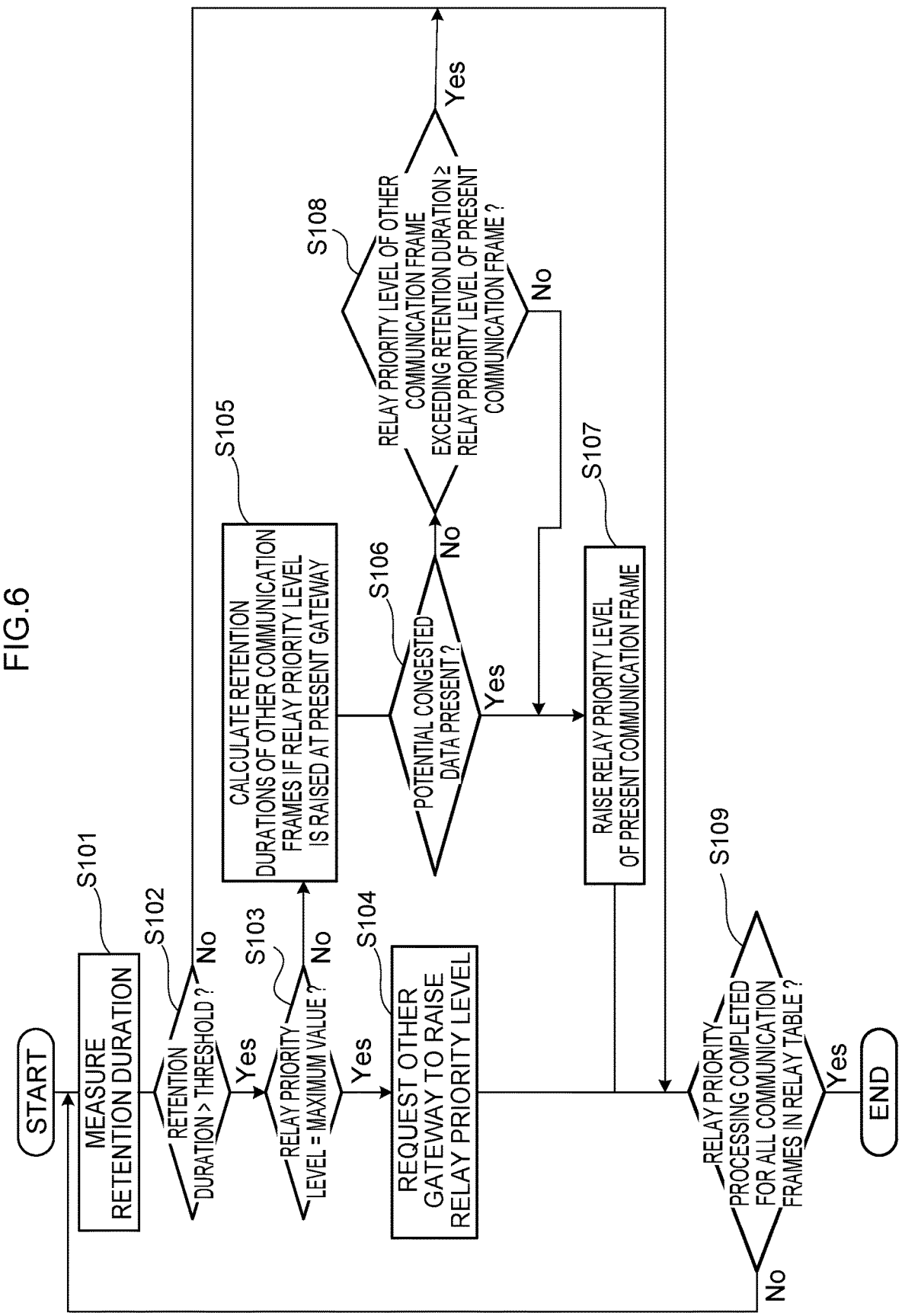
FIG. 6 is a flowchart showing a flow of relay priority processing according to the exemplary embodiment.

FIG. 6 is a flowchart showing a flow of the relay priority processing executed by each gateway 20. The gateway 20 executes the relay priority processing at intervals of a predetermined control frequency. As an example in the present exemplary embodiment, a situation is described in which, as shown in FIG. 5, data transmitted from the ECU 14A becomes congested data at the second gateway 20B before being received by the ECU 14B.

Relay Priority Processing

In step S101, the CPU 201 selects one of the communication frames in the relay table, measures the retained duration of the selected communication frame, and proceeds to step S102. When the CPU 201 executes the processing of step S101 for the first time, the CPU 201 selects, for example, the first communication frame in the relay table in ascending order or descending order of frame IDs. Alternatively, instead of the first communication frame in ascending order or descending order, the CPU 201 may select the earliest communication frame in relay order. Alternatively, the CPU 201 may select a communication frame at random.

In step S102, the CPU 201 makes a determination as to whether the measured retention duration exceeds the threshold specified for the respective frame ID in the relay table. That is, the CPU 201 makes a determination as to whether there is a congested date item in the relay table. When the CPU 201 determines in step S102 that the retention duration exceeds the threshold, the CPU 201 proceeds to step S103. When the CPU 201 determines in step S102 that the retention duration does not exceed the threshold, the CPU 201 proceeds to step S109.

In step S103, the CPU 201 makes a determination as to whether the relay priority level of the communication frame whose retention duration exceeds the threshold is at a maximum value. That is, the CPU 201 makes a determination as to whether the relay priority level of the communication frame is "High". When the CPU 201 determines in step S103 that the relay priority level is the maximum value, the CPU 201 proceeds to step S104. When the CPU 201 determines in step S103 that the relay priority level is not the maximum value, the CPU 201 proceeds to step S105.

In step S104, the CPU 201 makes a request to a different gateway 20, which is connected to be capable of communication by the external buses 22, to raise the relay priority level of the communication frame that has been determined to be a congested date item, and the CPU 201 proceeds to step S109.

In step S105, the CPU 201 calculates a retention duration of each other communication frame in the relay table if the relay priority level of the communication frame that is determined to be a congested date item at the present gateway 20 is raised. When the processing of step S105 is completed, the CPU 201 proceeds to step S106.

In step S106, on the basis of the calculated retention durations of the other communication frames, the CPU 201 makes a determination as to whether there is a potential congested date item of another communication frame in the relay table. The meaning of the term "potential congested date item" is intended to include a date item for which the calculated retention duration of the another communication frame exceeds the threshold thereof and that will thus become a new congested date item if the relay priority level of the congested date item is raised. In step S106, the CPU 201 makes a determination as to whether the calculated retention duration of each other communication frame is at or less than the threshold thereof. When the calculated retention durations of the other communication frames are less than or equal to the thresholds, the CPU 201 determines in step S106 that there is no potential congested date item, and the CPU 201 proceeds to step S107. When the calculated retention duration of another communication frame exceeds the threshold, the CPU 201 determines in step S106 that there is a potential congested date item, and the CPU 201 proceeds to step S108.

In step S107, the CPU 201 raises the relay priority level of the communication frame that is the congested date item. Hence, the congested date item may cut in front of a group at a relay priority level higher than the initial relay priority level thereof. Therefore, the congested date item rises in a relay sequence and the retention duration will be shorter. After the processing of step S107, the CPU 201 proceeds to the processing of step S109.

Alternatively, if it is determined in step S106 that there is a potential congested date item, the CPU 201 proceeds to step S108 and makes a determination as to whether the relay priority level of the other communication frame that is determined to be a potential congested date item is at least the relay priority level of the congested data. When it is determined in step S108 that the relay priority level of the potential congested date item is at least the relay priority level of the congested date item, the CPU 201 proceeds to step S109. When it is determined in step S108 that the relay priority level of the potential congested date item is less than the relay priority level of the congested date item, the CPU 201 proceeds to step S107 and raises the relay priority level of the communication frame that is the congested date item.

FIG. 7 is a diagram showing an example of a relay table prior to execution of the relay priority processing. In this diagram, the communication frame with the frame ID 0x220 is a date item to be transmitted from the ECU 14A to the ECU 14B. The retention duration threshold for frame ID 0x220 is 10 ms, but the measured value is 15 ms. Therefore, the retention duration exceeds the threshold. Thus, the communication frame with frame ID 0x220 is a congested date item at the second gateway 20B.

In step S103, a determination is made as to whether the relay priority level of the congested date item with frame ID 0x220 at the second gateway 20B is the maximum value. The relay priority level of the congested date item with frame ID 0x220 is Medium, which is not the maximum value. Therefore, the CPU 201 proceeds to step S105. In step S105, in order to calculate retention durations of the other communication frames if the relay priority level of the congested date item at the second gateway 20B is raised, the CPU 201 temporarily raises the relay priority level of frame ID 0x220 from Medium to High. The CPU 201 then measures retention durations for all the communication frames in the relay table.

FIG. 8 is a diagram showing the relay table of the second gateway 20B when the relay priority level of frame ID 0x220 is raised from Medium to High in accordance with the processing of step S105. As shown in this diagram, even when the relay priority level of frame ID 0x220 is raised from Medium to High, the measured relay durations of the other frame IDs are kept within the thresholds thereof. Therefore, there is no potential congested data. Accordingly, in step S107, the state in which the relay priority level of frame ID 0x220 is raised from Medium to High is preserved. As a result, the retention duration of frame ID 0x220 is shortened from 15 ms to 12 ms.

However, frame ID 0x220 still exceeds the retention duration threshold of 10 ms even when the relay priority level is changed to High. Therefore, when the relay priority processing, which is repeated at the predetermined control frequency, is subsequently executed, the CPU 201 proceeds from step S103 to step S104. In step S104, the CPU 201 sends a request to the other gateways 20 (the first gateway 20A and the third gateway 20C) to raise the relay priority level of the communication frame with frame ID 0x220.

Returning to FIG. 6, in step S109 the CPU 201 makes a determination as to whether the relay priority processing has been completed for all communication frames in the relay table. When the CPU 201 determines in step S109 that the relay priority processing has been completed for all communication frames, the processing ends. When the CPU 201 determines in step S109 that the relay priority processing has not been completed for all communication frames, the CPU 201 returns to step S101 and repeats the processing. For example, the CPU 201 selects the next communication frame in ascending order or descending order of frame IDs of the communication frames in the relay table, or in relay order of the communication frames, and repeats the processing from step S101. When the CPU 201 returns to step S101 and repeats the processing, any new communication frame stored in the relay table may be included.

Relay Priority Level Change Processing

Figure 9:
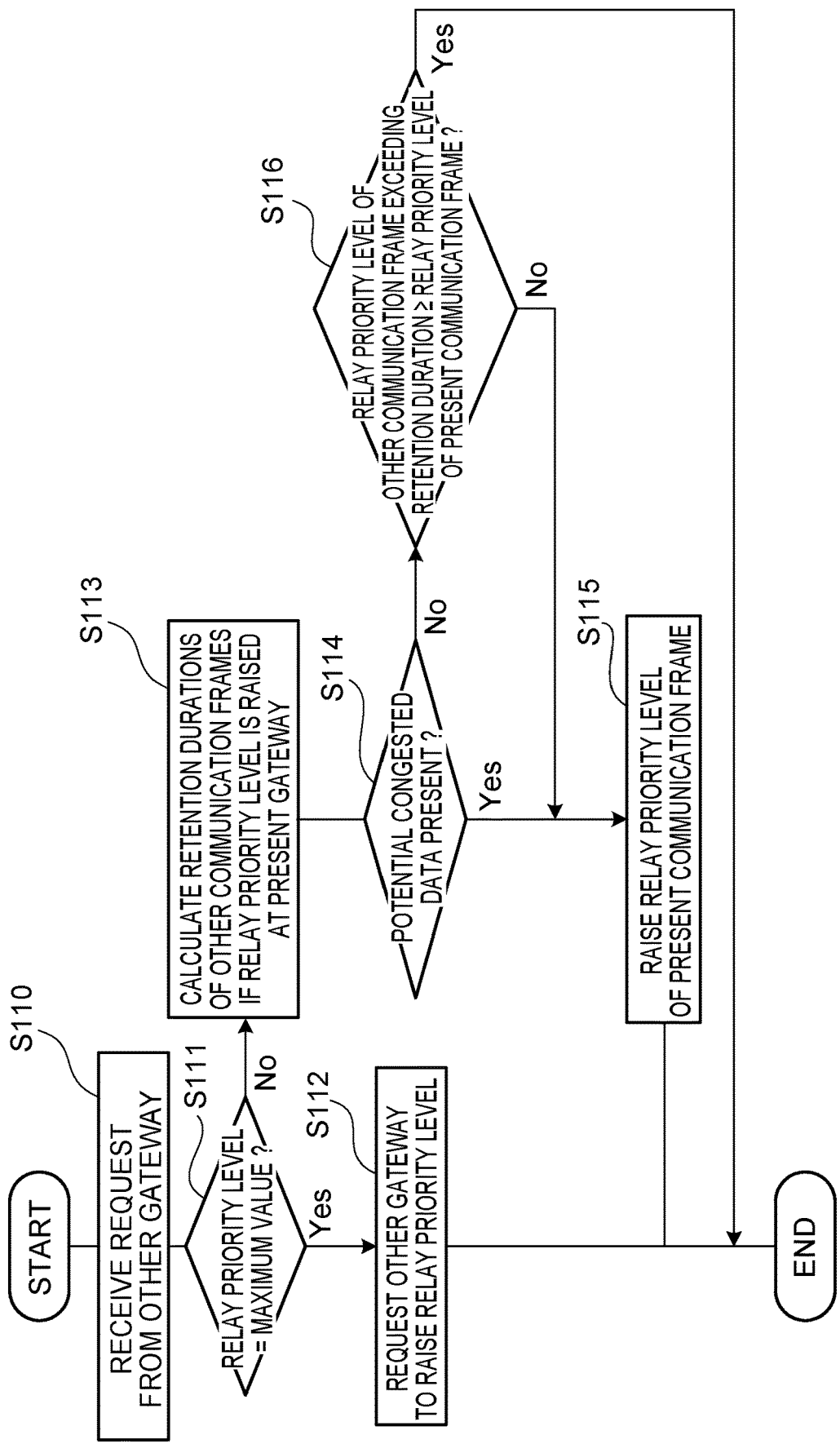
FIG. 9 is a flowchart showing a flow of relay priority level change processing according to the exemplary embodiment.

FIG. 9 is a flowchart showing a flow of the relay priority level change processing that is executed at each gateway 20. The gateway 20 executes the relay priority level change processing at intervals of a predetermined control frequency. As an example in the present exemplary embodiment, the situation is described in which, as shown in FIG. 5, data transmitted from the ECU 14A becomes congested data at the second gateway 20B before being received by the ECU 14B. In the present exemplary embodiment, as described above, information requesting that the relay priority level of the communication frame with frame ID 0x220 be raised is transmitted from the second gateway 20B to the first gateway 20A. In response, the first gateway 20A executes the relay priority level change processing shown in FIG. 9.

In step S110, when the request is received from the second gateway 20B, the CPU 201 of the first gateway 20A proceeds to step S111. In steps S111 to S115, the CPU 201 executes processing similar to the processing of steps S103 to S107 in the flowchart of the relay priority processing shown in FIG. 6. When the processing up to step S115 has been executed, the CPU 201 ends the processing.

FIG. 10 is a diagram showing an example of the relay table of the first gateway 20A prior to execution of the relay priority level change processing. In this diagram, the measured value of the retention duration of frame ID 0x220, which is the congested date item at the second gateway 20B, does not exceed the threshold of 10 ms.

In step S111, the CPU 201 of the first gateway 20A makes a determination as to whether the relay priority level of the communication frame with frame ID 0x220 is at the maximum value. The relay priority level of the communication frame with frame ID 0x220 is Medium, which is not the maximum value. Therefore, the CPU 201 proceeds to step S113. In step S113, the CPU 201 temporarily raises the priority level of frame ID 0x220 from Medium to High in order to calculate the retention durations of the other communication frames if the relay priority level of the communication frame with frame ID 0x220 is raised. The CPU 201 then measures retention durations for all the communication frames in the relay table.

FIG. 11 is a diagram showing the relay table of the first gateway 20A when the relay priority level of frame ID 0x220 is raised from Medium to High in accordance with the processing of step S113. As shown in this diagram, even when the relay priority level of frame ID 0x220 is raised from Medium to High, the measured relay durations of the other frame IDs are kept within the thresholds thereof and there is no potential congested data. Accordingly, in step S115, the state in which the relay priority level of frame ID 0x220 is raised from Medium to High is preserved. As a result, the retention duration of frame ID 0x220 is shortened from 4 ms to 2 ms.

As described above, in the example of the present exemplary embodiment shown in FIG. 5 to FIG. 11, data transmitted from the ECU 14A to the ECU 14B is relayed by the first gateway 20A and the second gateway 20B. By the execution of the relay priority processing and the relay priority level change processing at the first gateway 20A and the second gateway 20B, the duration (retention duration) required for relay of the communication frame with the frame ID 0x220 is shortened by 5 ms in total.

Thus, in the present exemplary embodiment, the plural gateways 20 (A to C) structuring the on-board network system 10 temporarily retain received date items and transmit the retained date items in descending order of relay priority levels. Therefore, even if data is concentrated at a certain gateway 20 and data congestion occurs, data with relatively high priority levels is prioritized. Therefore, transfer delays of data with high priority levels may be suppressed.

As the number of ECUs installed in a vehicle increases, gateway ECUs relaying data transmitted between the ECUs also tend to increase in number. When data being transferred is relayed through plural gateway ECUs, relay durations for which date items are retained by the gateway ECUs increase, depending on communication conditions in the on-board network. Therefore, delays in transfers of data may occur.

When data with a certain priority level is concentratedly received at a gateway ECU serving as a relay device, if date items are transferred only on the basis of priority level, it may not be possible to suppress transfer delays of a group of date items with the certain priority level. In contrast, when transmission and reception of data is relayed through plural gateway ECUs, even if data congestion occurs at one of these gateway ECUs, transfer durations of the date items over whole communication paths may be shortened if transfers of the date items are prioritized at the other gateway ECUs.

For each date item received at one of the gateways 20 (A to C), a retention duration for which the data is retained without being relayed is measured. For a congested date item, which is a date item whose measured retention duration is greater than the predetermined threshold, a request is sent to different gateways 20 from the present gateway 20 to raise the relay priority level of the congested date item. As a result, the date item that is congested at the present gateway 20 is relayed with priority by the different gateways 20, and a transfer duration of the congested date item over the whole communication path thereof is shortened. Thus, even if data with a certain priority level is concentratedly received at the present gateway 20, transfer delays of that data may be suppressed.

According to the exemplary embodiment described above, because the threshold of the retention duration is specified for each communication frame serving as a date item, the presence or absence of congestion may be determined accurately in accordance with types of communication frame. As a result, data transfer delays may be suppressed effectively.

When a date item with the highest priority level is congested at the present gateway 20, a request is made for the different gateways 20 to raise the relay priority level of the congested date item. Thus, when data with a high priority level is concentratedly received at the present gateway 20 and congestion occurs, the data is relayed by the different gateways 20 with priority and data transfer delays may be suppressed.

When a relay priority level of a date item that is congested at the present gateway 20 is less than the maximum value, the relay priority level of the congested date item is raised and the congested date item may be relayed with priority by the present gateway 20. Therefore, transfer delays may be suppressed for date items with low relay priority levels, which tend to be vulnerable to data congestion. That is, relay of a date item at a data relay priority level less than the maximum value is postponed whenever a date item with a higher relay priority level than that date item is received at the present gateway 20. Consequently, the duration for which that date item is retained at the present gateway 20 increases, and congestion of that date item is likely to occur. Accordingly, when congestion of a date item with a data relay priority level less than the maximum value occurs, a transfer delay may be suppressed by raising the relay priority level of that date item at the present gateway 20.

If the congested date item at the present gateway 20 has a relay priority level less than the maximum value but congestion of other data at the present gateway 20 would occur if the relay priority level of the congested date item was raised, the priority level is not raised but preserved. Therefore, relay of data with a relatively low priority level is prioritized only when that will not cause congestion of other data at the present gateway 20. Thus, transfer delays of the present gateway 20 as a whole may be suppressed effectively.

If the relay priority level of a potential congested date item is equal to or higher than that of the congested date item when the relay priority level of the congested date item is raised, the priority level of the congested date item is not raised but preserved. Therefore, a date item with an original relay priority level higher than that of the congested date item or an equal relay priority level is relayed with priority. On the other hand, if the relay priority level of the potential congested date item is lower than that of the congested date item, relay of the congested date item is prioritized and a transfer delay of the congested date item is suppressed. As a result, transfer delays of data at the present gateway 20 may be suppressed effectively.

In the exemplary embodiment described above, the received date items are transmitted in FIFO order for each relay priority level. Therefore, a date item whose relay priority level is raised at each gateway 20 cuts in front of other date items that were previously equal in relay priority level and can be relayed with priority. Meanwhile, of date items with the same relay priority level as one another, the date item received first is relayed with priority in accordance with FIFO. Consequently, when a date item in a group of date items with a relatively high relay priority level, which date item was originally specified with a lower relay priority level, cuts in front, delays in transfers of the date items that originally had the high relay data priority level are suppressed because the date items are relayed in FIFO order. Therefore, transfer delays of date items with lower relay priority levels may be suppressed even while transfers of date items with high original relay priority levels are prioritized.

When there is a plural number of the different gateways 20 in the on-board network system 10, the present gateway 20 sends the request to raise the relay priority level of a congested date item at all the gateways 20 except the present gateway 20. Therefore, in contrast to a configuration in which a request is sent only to a particular gateway 20, there is no need to generate data including a particular address when making the request. Thus, a processing load at the present gateway 20 may be reduced and a delay caused by overloading of the present gateway 20 may be suppressed.

Supplementary Descriptions

Figure 12:
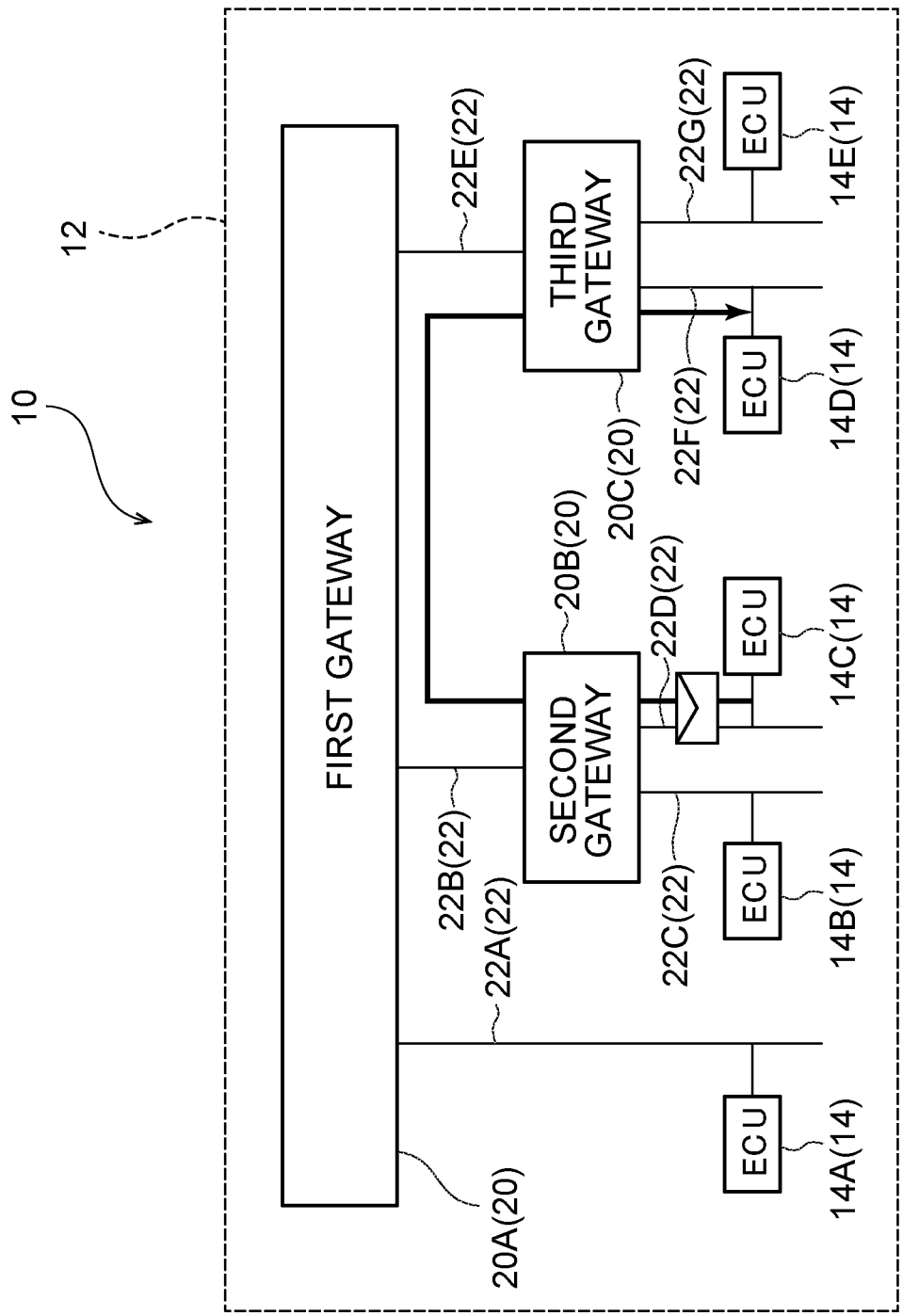
FIG. 12 is an alternative example of a communication path of data through the on-board network system according to the exemplary embodiment.

In the exemplary embodiment described above, a communication path of a date item being transferred from the ECU 14A to the ECU 14B installed in the vehicle 12 is described. In the exemplary embodiment described above, operational effects are described for a situation in which a date item is relayed through two of the gateways 20—the first gateway 20A and the second gateway 20B. However, the present invention provides similar operational effects when a date item is being relayed through three or more gateway ECUs. For example, as illustrated in FIG. 12, similar operational effects may be realized for a communication path of data being relayed through three of the gateways 20—the first gateway 20A, the second gateway 20B and the third gateway 20C—such as a date item being transferred from the ECU 14C to the ECU 14D.

The number of the gateways 20 illustrated in the exemplary embodiment described above is an example; two gateways or four or more gateways may be specified as appropriate in accordance with requirements.

The relay priority processing and relay priority level change processing that, in the exemplary embodiment described above, are executed by CPUs reading software (programs) may be executed by various kinds of processor other than the CPUs. Examples of processors in these cases include a PLD (programmable logic device) in which a circuit configuration can be modified after manufacturing, such as an FPGA (field programmable gate array) or the like, a dedicated electronic circuit which is a processor with a circuit configuration that is specially designed to execute specific processing, such as an ASIC (application-specific integrated circuit) or the like, and so forth. The relay priority processing and relay priority level change processing may be executed by one of these various kinds of processors, and may be executed by a combination of two or more processors of the same or different kinds (for example, plural FPGAs, a combination of a CPU with an FPGA, or the like). Hardware structures of these various kinds of processors are, to be more specific, electronic circuits combining circuit components such as semiconductor components and the like.

In the exemplary embodiment described above, a mode is described in which a program of the relay priority processing and relay priority level change processing is memorized in advance (installed) at the ROM or the storage, but this is not limiting. The program may be provided in a mode recorded on a recording medium, such as a CD-ROM (compact disc read-only memory), DVD-ROM (digital versatile disc read-only memory), USB (universal serial bus) memory or the like. Modes are also possible in which the program is downloaded from external equipment via a network.

What is claimed is:

1. An on-board network system, comprising at least one processor, the processor being configured to:
   for each item of data retained at a first relay device, measure a retention duration for which the data item is retained without being relayed, the first relay device being included among a plurality of relay devices, each of the plurality of relay devices temporarily retaining received data items and relaying the retained data items in descending order of relay priority level; and
   for a congested data item, which is a data item having a measured retention duration that exceeds a predetermined threshold, request a second relay device to raise a relay priority level of the congested data item at the second relay device, the second relay device being a different relay device from the first relay device among the plurality of relay devices, and the second relay device being configured to relay the congested date item.

2. The on-board network system according to claim 1, wherein the threshold is specified individually for each date item.

3. The on-board network system according to claim 1, wherein the processor is configured to request the second relay device to raise the relay priority level of the congested date item at the second relay device when the relay priority level of the congested date item at the first relay device is a maximum value.

4. The on-board network system according to claim 1, wherein the processor is configured to, when the relay priority level of the congested date item at the first relay device is less than a maximum value, raise the relay priority level of the congested date item at the first relay device.

5. The on-board network system according to claim 4, wherein the processor is configured to:
   determine whether a retention duration of a date item retained by the first relay device, which is different from the congested date item, would exceed the threshold if the relay priority level of the congested date item at the first relay device were to be raised; and
   when a potential congested date item, which is a date item having a retention duration that would exceed the threshold if the relay priority level of the congested date item were to be raised, is present, preserve the relay priority level of the congested date item without raising the relay priority level.

6. The on-board network system according to claim 5, wherein the processor is configured to:
   when the relay priority level of the potential congested date item at the first relay device is at least as high as the relay priority level of the congested date item at the first relay device, preserve the relay priority level of the congested date item without raising the relay priority level; and
   when the relay priority level of the potential congested date item at the first relay device is lower than the relay priority level of the congested date item at the first relay device, raise the relay priority level of the congested date item.

7. The on-board network system according to claim 1, wherein:
   the processor is included in each of the plurality of relay devices, and
   each processor relays the received date items in a first-in first-out (FIFO) order for each relay priority level.

8. The on-board network system according to claim 1, wherein the processor is configured to, when a plurality of the second relay devices are present, request each of the second relay devices to raise the relay priority level of the congested date item at the second relay device.

9. The on-board network system according to claim 1, wherein the processor is configured to request the second relay device to raise, at the second relay device, the relay priority level of the congested date item identified as congested data at the first relay device, the second relay device being a different relay device from the first relay device among the plurality of relay devices and being connected to at least one of an upstream side or a downstream side of the first relay device in a transmission direction of the congested date item.

10. A non-transitory computer readable medium storing a program executable by a computer to perform processing, the processing comprising:
    for each date item retained at a first relay device, measuring a retention duration for which the date item is retained without being relayed, the first relay device being included among a plurality of relay devices, and each relay device temporarily retaining received date items and relaying the retained date items in descending order of relay priority level;

determining whether or not the measured retention duration of each date item exceeds a predetermined threshold that is specified for each of the date items; and for a congested date item, which is a date item having a retention duration that has been determined to exceed the predetermined threshold, requesting a second relay device to raise a relay priority level of the congested date item at the second relay device and relay the congested date item, the second relay device being a different relay device from the first relay device among the plurality of relay devices.

\* \* \* \* \*